(12) United States Patent
Free et al.

(10) Patent No.: US 10,704,728 B2
(45) Date of Patent: Jul. 7, 2020

(54) PIPE LINER AND METHOD OF MAKING SAME

(71) Applicant: INA ACQUISITION CORP., Wilmington, DE (US)

(72) Inventors: Charles Free, Hernando, MS (US); Abu Abraham, St. Louis, MO (US); Yevgeny Eugene Zaltsman, St. Louis, MO (US)

(73) Assignee: INA Acquisition Corp., Wilmington, DE (US)

( * ) Notice: Subject to any disclaimer, the term of this patent is extended or adjusted under 35 U.S.C. 154(b) by 182 days.

(21) Appl. No.: 15/926,325

(22) Filed: Mar. 20, 2018

(65) Prior Publication Data

US 2019/0293223 A1    Sep. 26, 2019

(51) Int. Cl.
*F16L 55/16*     (2006.01)
*F16L 55/165*    (2006.01)
(Continued)

(52) U.S. Cl.
CPC ...... *F16L 55/1656* (2013.01); *B29C 63/0021* (2013.01); *B29C 65/5042* (2013.01); *B29C 65/62* (2013.01); *B29C 66/7234* (2013.01); *B29C 67/0018* (2013.01); *B32B 1/08* (2013.01); *B32B 5/022* (2013.01); *B32B 5/26* (2013.01); *B32B 7/03* (2019.01); *B32B 7/08* (2013.01); *F16L 55/1651* (2013.01); *B29L 2023/006* (2013.01); *B32B 2305/10* (2013.01);
(Continued)

(58) Field of Classification Search
CPC .................. F16L 55/1656; F16L 55/1651
USPC ................. 138/97, 98; 405/150.1, 184.2
See application file for complete search history.

(56) References Cited

U.S. PATENT DOCUMENTS 3,459,014 A    8/1969  Berning
3,520,749 A    7/1970  Rubenstein
(Continued)

FOREIGN PATENT DOCUMENTS

AU    8533298 A    2/1999
DE    2753669 A1   10/1978
(Continued)

OTHER PUBLICATIONS

Extended European Search Report, Application No. 19163265.2-1010, dated Aug. 9, 2019, pp. 9.
(Continued)

*Primary Examiner* — James F Hook
(74) *Attorney, Agent, or Firm* — Stinson LLP

(57) ABSTRACT

An eversion liner for lining a pipe includes an impermeable outer portion, inner and outer strength portions inside the impermeable outer portion, and a middle portion including at least one felt layer radially between the inner and outer strength portions. At least one of the inner and outer strength portions is formed from a unitary sheet of strength material that includes parallel chopped strands of fiber. The longitudinal edge margins of the sheet of strength material are positioned in overlapping engagement and joined together by joining structure. The parallel chopped fibers can be oriented transverse to the length of the liner. The joining structure can prevent reduction in a width of the overlapped edge margins as the liner expands during eversion.

20 Claims, 3 Drawing Sheets

(51) Int. Cl.
  *B32B 7/03* (2019.01)
  *B29C 63/00* (2006.01)
  *B29C 65/50* (2006.01)
  *B29C 65/62* (2006.01)
  *B29C 65/00* (2006.01)
  *B29C 67/00* (2017.01)
  *B32B 1/08* (2006.01)
  *B32B 5/02* (2006.01)
  *B32B 5/26* (2006.01)
  *B32B 7/08* (2019.01)
  *B29L 23/00* (2006.01)

(52) U.S. Cl.
  CPC ... *B32B 2305/22* (2013.01); *B32B 2307/7265* (2013.01); *B32B 2597/00* (2013.01)

(56) References Cited

U.S. PATENT DOCUMENTS

| | | | |
|---|---|---|---|
| 4,009,063 A | 2/1977 | Wood | |
| 4,671,840 A | 6/1987 | Renaud | |
| 4,681,783 A * | 7/1987 | Hyodo | F16L 55/1656 138/124 |
| 4,836,715 A | 6/1989 | Wood | |
| 4,976,290 A | 12/1990 | Gelin et al. | |
| 5,010,440 A * | 4/1991 | Endo | B29C 53/382 138/97 |
| 5,049,003 A | 9/1991 | Barton | |
| 5,077,107 A | 12/1991 | Kaneda et al. | |
| 5,164,237 A | 11/1992 | Kaneda et al. | |
| 5,168,006 A | 12/1992 | Inoguchi et al. | |
| 5,186,987 A | 2/1993 | Imoto et al. | |
| 5,205,886 A * | 4/1993 | White | B29C 63/34 138/145 |
| 5,218,810 A | 6/1993 | Isley, Jr. | |
| 5,271,433 A | 12/1993 | Schwert et al. | |
| D343,628 S | 1/1994 | Sciholtz | |
| 5,322,563 A | 6/1994 | van Bonn et al. | |
| 5,334,429 A | 8/1994 | Imoto et al. | |
| D358,599 S | 5/1995 | Dietterich et al. | |
| 5,411,060 A * | 5/1995 | Chandler | B29C 63/34 138/103 |
| 5,423,630 A | 6/1995 | Imoto et al. | |
| 5,443,880 A | 8/1995 | Wike | |
| 5,501,248 A | 3/1996 | Kiest, Jr. | |
| 5,503,695 A * | 4/1996 | Imoto | B29C 63/34 156/287 |
| 5,535,786 A | 7/1996 | Makela et al. | |
| 5,549,856 A | 8/1996 | Yokoshima | |
| 5,593,700 A | 1/1997 | Stilgenbauer | |
| 5,597,227 A | 1/1997 | Bergen et al. | |
| 5,632,575 A | 5/1997 | Lorenzen et al. | |
| 5,634,672 A | 6/1997 | Stack et al. | |
| 5,649,398 A | 7/1997 | Isley, Jr. et al. | |
| 5,653,555 A | 8/1997 | Catallo | |
| 5,683,530 A | 11/1997 | Fawley et al. | |
| 5,698,056 A * | 12/1997 | Kamiyama | B29C 65/5042 138/98 |
| 5,700,110 A | 12/1997 | Kamiyama et al. | |
| 5,703,154 A | 12/1997 | Davis et al. | |
| 5,720,575 A | 2/1998 | Henrie | |
| 5,758,796 A | 6/1998 | Nishimura et al. | |
| 5,769,109 A | 6/1998 | Stanton et al. | |
| 5,778,936 A | 7/1998 | McAlpine | |
| 5,798,013 A | 8/1998 | Brandenburger | |
| 5,799,705 A | 9/1998 | Friedrich et al. | |
| 5,836,357 A | 11/1998 | Kittson et al. | |
| 5,855,729 A | 1/1999 | Kiest, Jr. et al. | |
| 5,868,169 A | 2/1999 | Catallo | |
| 5,873,357 A | 2/1999 | Lake | |
| 5,873,391 A | 2/1999 | Kittson et al. | |
| 5,876,645 A * | 3/1999 | Johnson | F16L 55/1651 138/141 |
| 5,881,760 A | 3/1999 | Del Zotto | |
| 5,911,246 A | 6/1999 | Kittson et al. | |
| 5,919,327 A | 7/1999 | Smith | |
| 5,931,198 A | 8/1999 | Raji et al. | |
| 5,931,199 A | 8/1999 | Kittson et al. | |
| 5,937,910 A | 8/1999 | Chandler | |
| 5,971,030 A | 10/1999 | Maimets | |
| 5,971,440 A | 10/1999 | Boatman | |
| 5,975,878 A | 11/1999 | Wood et al. | |
| 5,988,702 A | 11/1999 | Sas-Jaworsky | |
| 6,019,136 A | 2/2000 | Walsh et al. | |
| 6,027,783 A | 2/2000 | Wagener | |
| 6,042,668 A | 3/2000 | Kamiyama et al. | |
| 6,044,867 A | 4/2000 | Tweedie et al. | |
| 6,085,794 A | 7/2000 | Kamiyama et al. | |
| 6,085,798 A | 7/2000 | Le Nouveau | |
| 6,103,046 A | 8/2000 | Smith | |
| 6,146,491 A | 11/2000 | Wood et al. | |
| 6,168,846 B1 | 1/2001 | Molyneaux | |
| 6,170,531 B1 | 1/2001 | Jung et al. | |
| 6,196,271 B1 | 3/2001 | Braun et al. | |
| 6,206,993 B1 | 3/2001 | Kiest, Jr. et al. | |
| 6,207,002 B1 | 3/2001 | Odell et al. | |
| 6,228,312 B1 | 5/2001 | Boyce | |
| 6,254,709 B1 * | 7/2001 | Kamiyama | B29C 66/038 156/91 |
| 6,276,401 B1 | 8/2001 | Wilson | |
| 6,296,066 B1 | 10/2001 | Terry et al. | |
| 6,296,729 B1 | 10/2001 | Kamiyama et al. | |
| 6,349,748 B1 | 2/2002 | Dodds et al. | |
| 6,354,434 B1 | 3/2002 | Ellyin et al. | |
| 6,360,780 B1 | 3/2002 | Adolphs et al. | |
| 6,361,080 B1 | 3/2002 | Walsh et al. | |
| 6,446,670 B1 | 9/2002 | Woodward et al. | |
| 6,488,323 B1 | 12/2002 | Bouligny | |
| 6,503,024 B2 | 1/2003 | Rupiper | |
| 6,508,276 B2 | 1/2003 | Rädlinger et al. | |
| 6,510,781 B2 | 1/2003 | Pecca et al. | |
| 6,562,426 B1 | 5/2003 | Kamiyama et al. | |
| 6,572,306 B2 | 6/2003 | Prusak | |
| 6,578,882 B2 | 6/2003 | Toliver | |
| 6,595,069 B2 | 7/2003 | Frey et al. | |
| 6,615,875 B2 | 9/2003 | Adolphs et al. | |
| 6,634,387 B1 | 10/2003 | Glejbøl | |
| 6,641,688 B1 | 11/2003 | Gearhart | |
| 6,668,596 B1 | 12/2003 | Wagener | |
| 6,679,966 B1 | 1/2004 | Brandenburger | |
| 6,681,641 B2 | 1/2004 | Baumoel | |
| 6,698,519 B2 | 3/2004 | Nguyen et al. | |
| 6,708,729 B1 | 3/2004 | Smith | |
| 6,732,763 B2 | 5/2004 | Williamson et al. | |
| 6,737,134 B2 | 5/2004 | Friedrich et al. | |
| 6,739,355 B2 | 5/2004 | Glejbøl | |
| 6,769,484 B2 | 8/2004 | Longmore | |
| 6,854,479 B2 | 2/2005 | Harwood | |
| 6,863,137 B2 | 3/2005 | Terry et al. | |
| 6,869,667 B2 | 3/2005 | Kawazu et al. | |
| 6,889,716 B2 | 5/2005 | Lundberg et al. | |
| 6,889,718 B2 | 5/2005 | Glejbøl | |
| 6,890,476 B2 | 5/2005 | Wagener et al. | |
| 6,923,217 B2 | 8/2005 | Smith | |
| 6,923,273 B2 | 8/2005 | Terry et al. | |
| 6,932,116 B2 | 8/2005 | Smith et al. | |
| 6,978,806 B2 | 12/2005 | Glejbøl | |
| 6,981,526 B2 | 1/2006 | Glejbøl | |
| 7,000,645 B2 | 2/2006 | Glejbøl | |
| 7,018,691 B2 | 3/2006 | McNeil | |
| 7,025,580 B2 | 4/2006 | Heagy et al. | |
| 7,069,955 B2 | 7/2006 | Glejbøl | |
| 7,096,890 B2 | 8/2006 | Woolstencroft et al. | |
| 7,100,632 B2 | 9/2006 | Harwood | |
| 7,137,757 B1 | 11/2006 | Cosban | |
| 7,153,395 B2 | 12/2006 | Foster et al. | |
| 7,172,038 B2 | 2/2007 | Terry et al. | |
| 7,178,588 B2 | 2/2007 | Harper et al. | |
| 7,220,081 B1 | 5/2007 | Gantt, Jr. | |
| 7,231,975 B2 | 6/2007 | Lavaure et al. | |
| 7,231,984 B2 | 6/2007 | Jensch | |
| 7,241,076 B1 | 7/2007 | Cosban | |
| 7,261,788 B1 | 8/2007 | Driver | |

(56) References Cited

U.S. PATENT DOCUMENTS

| | | |
|---|---|---|
| 7,264,695 B2 | 9/2007 | Foster et al. |
| 7,302,973 B2 | 12/2007 | Glejbøl et al. |
| 7,306,011 B2 | 12/2007 | Kiest, Jr. |
| 7,360,797 B2 | 4/2008 | Posson |
| D568,347 S | 5/2008 | Manera et al. |
| 7,472,722 B2 | 1/2009 | Nadarajah et al. |
| 7,478,650 B2 | 1/2009 | Pleydon et al. |
| 7,478,659 B2 | 1/2009 | Jeon |
| 7,494,592 B2 | 2/2009 | Deskins |
| 7,500,494 B2 | 3/2009 | Robinson et al. |
| 7,527,076 B2 | 5/2009 | Lepola et al. |
| 7,621,333 B2 | 11/2009 | Marchal |
| 7,632,408 B1 | 12/2009 | Everson |
| 7,637,169 B2 | 12/2009 | Shanahan et al. |
| 7,666,047 B2 | 2/2010 | Suzuki et al. |
| 7,690,092 B2 | 4/2010 | Wagener |
| 7,691,261 B2 | 4/2010 | Deskins |
| 7,708,033 B2 | 5/2010 | Tanaka et al. |
| 7,727,447 B2 | 6/2010 | Song et al. |
| 7,784,552 B2 | 8/2010 | Brouse |
| 7,786,223 B2 | 8/2010 | Mullelr-Frischinger |
| 7,794,813 B2 | 9/2010 | Nguyen et al. |
| 7,858,189 B2 | 12/2010 | Wagener et al. |
| 7,891,381 B2 | 2/2011 | Anders et al. |
| 7,896,032 B2 | 3/2011 | Kiest, Jr. |
| 7,926,578 B2 | 4/2011 | Moffitt et al. |
| 7,938,146 B2 | 5/2011 | Brooks et al. |
| 7,942,167 B1 | 5/2011 | Llewellyn |
| 7,975,726 B2 | 7/2011 | Kiest, Jr. |
| 7,976,920 B2 | 7/2011 | Braad et al. |
| D643,445 S | 8/2011 | Harrison |
| 7,987,875 B2 | 8/2011 | Rytter |
| 7,997,115 B2 | 8/2011 | Tidl et al. |
| D646,700 S | 10/2011 | Takeuchi |
| 8,047,238 B2 | 11/2011 | Wiessner et al. |
| 8,047,396 B2 | 11/2011 | Jenkins et al. |
| 8,069,880 B2 | 12/2011 | Friedrich et al. |
| 8,082,954 B2 | 12/2011 | Rytter |
| 8,110,103 B2 | 2/2012 | Mormino et al. |
| 8,114,057 B2 | 2/2012 | Gerdts et al. |
| 8,119,047 B2 | 2/2012 | Moore et al. |
| D658,689 S | 5/2012 | Li |
| 8,256,089 B2 | 9/2012 | Pionetti |
| 8,272,406 B2 | 9/2012 | McKaigue et al. |
| 8,322,382 B2 | 12/2012 | Slagsvold et al. |
| 8,375,972 B2 | 2/2013 | Kiest, Jr. |
| 8,418,337 B2 | 4/2013 | Salama |
| 8,580,364 B2 | 11/2013 | Quitter |
| 8,590,575 B2 | 11/2013 | D'Hulster |
| D696,317 S | 12/2013 | Carper |
| 8,596,917 B2 | 12/2013 | Emmons et al. |
| 8,609,557 B2 | 12/2013 | Palinsky et al. |
| 8,616,243 B2 | 12/2013 | Kiest, Jr. |
| 8,636,869 B2 | 1/2014 | Wiessner et al. |
| D700,224 S | 2/2014 | Kmoch et al. |
| 8,647,456 B2 | 2/2014 | Wagener et al. |
| 8,678,043 B2 | 3/2014 | Emmons et al. |
| 8,697,215 B2 | 4/2014 | Lahijani |
| 8,739,809 B2 | 6/2014 | Kiest, Jr. |
| 8,740,259 B2 | 6/2014 | Mazzaferro et al. |
| 8,801,329 B2 | 8/2014 | Bateman et al. |
| 8,813,873 B2 | 8/2014 | Beardmore et al. |
| 8,844,577 B2 | 9/2014 | Kiest, Jr. |
| 8,857,860 B2 | 10/2014 | Schwalbach et al. |
| 8,869,839 B1 | 10/2014 | D'Hulster |
| 8,914,954 B2 | 12/2014 | Klethi et al. |
| 8,940,113 B2 | 1/2015 | Lindner et al. |
| 8,978,708 B2 | 3/2015 | Brandenburger et al. |
| 9,004,163 B2 | 4/2015 | Tverlid |
| 9,040,136 B2 | 5/2015 | Procida |
| D733,198 S | 6/2015 | Chappel |
| 9,052,053 B2 | 6/2015 | Kiest |
| 9,074,718 B2 | 7/2015 | Kiest, Jr. |
| 9,074,720 B2 | 7/2015 | D'Hulster |
| 9,163,770 B2 | 10/2015 | Kiest, Jr. et al. |
| 9,188,269 B2 | 11/2015 | Hairston et al. |
| 9,194,513 B2 | 11/2015 | Sierra |
| 9,222,611 B2 | 12/2015 | Colasanto |
| 9,248,605 B2 | 2/2016 | Quitter |
| 9,261,216 B2 | 2/2016 | Stalcup, II et al. |
| 9,261,221 B2 | 2/2016 | Kiest, Jr. |
| 9,267,635 B2 | 2/2016 | Kulkarni et al. |
| 9,278,308 B2 | 3/2016 | Jamtvedt et al. |
| 9,316,339 B1 | 4/2016 | Souza et al. |
| 9,321,210 B2 | 4/2016 | Toliver et al. |
| 9,366,375 B2 | 6/2016 | Kiest, Jr. |
| D764,554 S | 8/2016 | Charles et al. |
| 9,435,468 B2 | 9/2016 | Graham |
| 9,453,597 B2 | 9/2016 | Delaney et al. |
| 9,453,606 B2 | 9/2016 | Catha et al. |
| 9,488,511 B2 | 11/2016 | Barto |
| 9,551,441 B2 | 1/2017 | Dowe et al. |
| 9,579,854 B2 | 2/2017 | Klethy et al. |
| 10,077,855 B2 * | 9/2018 | Free ............ F16L 9/14 |
| 2001/0010781 A1 | 8/2001 | Prusak |
| 2001/0039875 A1 | 11/2001 | Pecca et al. |
| 2001/0043839 A1 | 11/2001 | Prusak |
| 2001/0046415 A1 | 11/2001 | Rupiper |
| 2002/0004116 A1 | 1/2002 | Friedrich et al. |
| 2002/0007970 A1 | 1/2002 | Terry et al. |
| 2002/0033554 A1 | 3/2002 | Heagy et al. |
| 2002/0036085 A1 | 3/2002 | Bass et al. |
| 2002/0060454 A1 | 5/2002 | Toliver |
| 2002/0124898 A1 | 9/2002 | Renaud et al. |
| 2002/0162733 A1 | 11/2002 | Foster et al. |
| 2003/0034156 A1 | 2/2003 | Gondouin |
| 2003/0047007 A1 | 3/2003 | Baumoel |
| 2003/0066567 A1 | 4/2003 | Manners |
| 2003/0075361 A1 | 4/2003 | Terry et al. |
| 2003/0108682 A1 | 6/2003 | Lehrman et al. |
| 2003/0113489 A1 | 6/2003 | Smith |
| 2003/0121559 A1 | 7/2003 | Glejbøl et al. |
| 2003/0138298 A1 | 7/2003 | Mercier |
| 2003/0141303 A1 | 7/2003 | Grazziotin |
| 2003/0155124 A1 | 8/2003 | Nguyen et al. |
| 2003/0164196 A1 | 9/2003 | Glejbøl et al. |
| 2003/0178201 A1 | 9/2003 | Gleim et al. |
| 2003/0213119 A1 | 11/2003 | Frey et al. |
| 2003/0217777 A1 | 11/2003 | Williamson et al. |
| 2003/0234056 A1 * | 12/2003 | Woolstencroft ...... B29D 23/001 138/98 |
| 2003/0234057 A1 | 12/2003 | Woolstencroft et al. |
| 2004/0035471 A1 | 2/2004 | Harwood |
| 2004/0040703 A1 | 3/2004 | Longmore |
| 2004/0050442 A1 | 3/2004 | Glejbøl et al. |
| 2004/0079524 A1 | 4/2004 | Bass et al. |
| 2004/0089358 A1 | 5/2004 | Burd et al. |
| 2004/0094209 A1 | 5/2004 | Harwood |
| 2004/0118468 A1 | 6/2004 | Mestemacher |
| 2004/0129373 A1 | 7/2004 | Nadarajah et al. |
| 2004/0134767 A1 | 7/2004 | Foster et al. |
| 2004/0144440 A1 | 7/2004 | Lundberg et al. |
| 2004/0144530 A1 | 7/2004 | Bass et al. |
| 2004/0149341 A1 | 8/2004 | Driver |
| 2004/0168960 A1 | 9/2004 | Holtzapple et al. |
| 2004/0171136 A1 | 9/2004 | Holtzapple et al. |
| 2004/0182462 A1 | 9/2004 | Glejbøl et al. |
| 2004/0194838 A1 | 10/2004 | Glejbøl et al. |
| 2004/0194967 A1 | 10/2004 | Jaensch |
| 2004/0221907 A1 | 11/2004 | Glejbøl |
| 2004/0247810 A1 | 12/2004 | McNeil |
| 2004/0258479 A1 | 12/2004 | Manners |
| 2004/0258837 A1 | 12/2004 | Robinson |
| 2004/0261998 A1 | 12/2004 | Lavaure et al. |
| 2005/0028880 A1 | 2/2005 | Smith |
| 2005/0028881 A1 | 2/2005 | Smith et al. |
| 2005/0051344 A1 | 3/2005 | Goss |
| 2005/0115741 A1 | 6/2005 | Terry et al. |
| 2005/0161100 A1 | 7/2005 | Pleydon et al. |
| 2005/0173919 A1 | 8/2005 | Posson |
| 2005/0183785 A1 | 8/2005 | Lundberg et al. |
| 2005/0247448 A1 | 11/2005 | Harper et al. |
| 2005/0257846 A1 | 11/2005 | Nordling, Jr. |
| 2005/0281970 A1 | 12/2005 | LaMarca, II et al. |

(56) References Cited

U.S. PATENT DOCUMENTS

| | | |
|---|---|---|
| 2006/0006124 A1 | 1/2006 | Deskins |
| 2006/0048833 A1 | 3/2006 | Glejbøl et al. |
| 2006/0090804 A1 | 5/2006 | Driver et al. |
| 2006/0118028 A1 | 6/2006 | Schroeder |
| 2006/0124188 A1 | 6/2006 | Catha et al. |
| 2006/0137757 A1 | 6/2006 | McKeen et al. |
| 2006/0151042 A1 | 7/2006 | Stringfellow et al. |
| 2006/0175053 A1 | 8/2006 | Marchal |
| 2006/0185750 A1 | 8/2006 | Mestemacher |
| 2006/0219311 A1 | 10/2006 | Kiest, Jr. |
| 2006/0278290 A1* | 12/2006 | Warren .......... F16L 55/165 138/98 |
| 2007/0018448 A1 | 1/2007 | Nadarajah et al. |
| 2007/0029688 A1 | 2/2007 | Delaney et al. |
| 2007/0036925 A1 | 2/2007 | Braad |
| 2007/0074774 A1 | 4/2007 | Chandler |
| 2007/0114689 A1 | 5/2007 | Driver et al. |
| 2007/0119512 A1 | 5/2007 | Rytter |
| 2007/0144784 A1 | 6/2007 | Head et al. |
| 2007/0163665 A1 | 7/2007 | Lepola et al. |
| 2007/0172616 A1 | 7/2007 | Ehsani et al. |
| 2007/0180610 A1 | 8/2007 | Mohr et al. |
| 2007/0267785 A1 | 11/2007 | Bellamy et al. |
| 2008/0017263 A1 | 1/2008 | Robinson et al. |
| 2008/0053554 A1 | 3/2008 | Salama |
| 2008/0060699 A1 | 3/2008 | Mestemacher |
| 2008/0078463 A1 | 4/2008 | Kiest |
| 2008/0121359 A1 | 5/2008 | Holtzapple et al. |
| 2008/0145579 A1 | 6/2008 | Nguyen et al. |
| 2008/0173396 A1 | 7/2008 | Wiessner |
| 2008/0217063 A1 | 9/2008 | Moore et al. |
| 2008/0277012 A1 | 11/2008 | Anders et al. |
| 2008/0277013 A1 | 11/2008 | Anders et al. |
| 2008/0283138 A1 | 11/2008 | Rytter |
| 2009/0036582 A1 | 2/2009 | Muller-Frischinger |
| 2009/0056823 A1 | 3/2009 | Kiest, Jr. |
| 2009/0090508 A1 | 4/2009 | Brouse |
| 2009/0101345 A1 | 4/2009 | Moffitt et al. |
| 2009/0116927 A1 | 5/2009 | Keenan et al. |
| 2009/0127180 A1 | 5/2009 | Deskins |
| 2009/0129853 A1 | 5/2009 | Pionetti |
| 2009/0165927 A1 | 7/2009 | Driver et al. |
| 2009/0166273 A1 | 7/2009 | Mormino et al. |
| 2009/0188327 A1 | 7/2009 | Shanahan et al. |
| 2009/0205733 A1 | 8/2009 | Stringfellow et al. |
| 2009/0250134 A1 | 10/2009 | Slagsvold et al. |
| 2009/0250135 A1 | 10/2009 | Friedrich et al. |
| 2009/0308475 A1 | 12/2009 | Stringfellow et al. |
| 2009/0314409 A1 | 12/2009 | Ehsani |
| 2010/0038019 A1 | 2/2010 | Da Silveira et al. |
| 2010/0062202 A1 | 3/2010 | Procida |
| 2010/0078118 A1 | 4/2010 | Ehsani |
| 2010/0181325 A1 | 7/2010 | Jenkins et al. |
| 2010/0212803 A1 | 8/2010 | Carr et al. |
| 2010/0243154 A1 | 9/2010 | Wiessner et al. |
| 2010/0291903 A1 | 11/2010 | McPherson |
| 2010/0295198 A1 | 11/2010 | Kiest, Jr. |
| 2010/0300760 A1 | 12/2010 | Beardmore et al. |
| 2011/0030830 A1 | 2/2011 | McKaigue et al. |
| 2011/0052325 A1 | 3/2011 | Bateman et al. |
| 2011/0074147 A1 | 3/2011 | Thomas et al. |
| 2011/0083766 A1 | 4/2011 | Anders |
| 2011/0101686 A1 | 5/2011 | Dalmolen et al. |
| 2011/0135899 A1 | 6/2011 | Meltzer et al. |
| 2011/0236138 A1 | 9/2011 | Cosban |
| 2011/0244125 A1 | 10/2011 | Weisenberg et al. |
| 2011/0247755 A1 | 10/2011 | Sanders |
| 2011/0259461 A1 | 10/2011 | Kiest, Jr. |
| 2011/0277864 A1 | 11/2011 | Kiest, Jr. |
| 2011/0277868 A1 | 11/2011 | Emmons et al. |
| 2011/0280665 A1 | 11/2011 | Emmons et al. |
| 2012/0000563 A1 | 1/2012 | Lahijani |
| 2012/0006439 A1 | 1/2012 | Kiest, Jr. |
| 2012/0007714 A1 | 1/2012 | Mühlin |
| 2012/0012217 A1 | 1/2012 | Hairston et al. |
| 2012/0018080 A1 | 1/2012 | Wiessner et al. |
| 2012/0048455 A1 | 3/2012 | Rocher et al. |
| 2012/0056414 A1 | 3/2012 | Thomas et al. |
| 2012/0090721 A1 | 4/2012 | Toliver et al. |
| 2012/0111578 A1 | 5/2012 | Tverlid |
| 2012/0145271 A1 | 6/2012 | McKeller et al. |
| 2012/0175004 A1 | 7/2012 | Kiest, Jr. |
| 2012/0193908 A1 | 8/2012 | Mazzaferro et al. |
| 2012/0199233 A1 | 8/2012 | Mizell et al. |
| 2012/0211114 A1 | 8/2012 | Nilsson et al. |
| 2012/0248766 A1 | 10/2012 | Schwalbach et al. |
| 2012/0261015 A1 | 10/2012 | Warren |
| 2012/0261016 A1 | 10/2012 | Fuechtjohann et al. |
| 2012/0280488 A1 | 11/2012 | Pionetti |
| 2012/0285575 A1 | 11/2012 | Catha et al. |
| 2013/0019982 A1 | 1/2013 | Kobayashi |
| 2013/0019983 A1 | 1/2013 | Kiest, Jr. |
| 2013/0033033 A1 | 2/2013 | Eck |
| 2013/0061971 A1 | 3/2013 | Chamberland |
| 2013/0074972 A1 | 3/2013 | Fuechtjohann et al. |
| 2013/0081732 A1 | 4/2013 | Kiest, Jr. |
| 2013/0112303 A1 | 5/2013 | Kiest, Jr. |
| 2013/0126034 A1 | 5/2013 | Sierra |
| 2013/0133775 A1 | 5/2013 | Duncan et al. |
| 2013/0213513 A1 | 8/2013 | Kiest, Jr. |
| 2013/0220465 A1 | 8/2013 | D'Hulster |
| 2013/0263443 A1 | 10/2013 | Delaney et al. |
| 2013/0280477 A1 | 10/2013 | Davis et al. |
| 2014/0027000 A1 | 1/2014 | Kiest, Jr. |
| 2014/0034175 A1 | 2/2014 | Fyfe |
| 2014/0050464 A1 | 2/2014 | Lin |
| 2014/0076447 A1 | 3/2014 | Kiest, Jr. |
| 2014/0085643 A1 | 3/2014 | Kiest, Jr. |
| 2014/0116557 A1 | 5/2014 | Bichler |
| 2014/0116566 A1 | 5/2014 | Bader et al. |
| 2014/0209128 A1 | 7/2014 | Abdul-Ali |
| 2014/0238525 A1 | 8/2014 | Dyksterhouse |
| 2014/0251480 A1 | 9/2014 | Kulkarni et al. |
| 2014/0261832 A1 | 9/2014 | Kiest, Jr. et al. |
| 2014/0261972 A1 | 9/2014 | Colasanto |
| 2014/0262267 A1 | 9/2014 | Fustos et al. |
| 2014/0284914 A1 | 9/2014 | Tsambarlis |
| 2014/0290782 A1 | 10/2014 | Dowe et al. |
| 2014/0326511 A1 | 11/2014 | Beardmore et al. |
| 2014/0352955 A1 | 12/2014 | Tubel et al. |
| 2014/0356074 A1 | 12/2014 | Bureau et al. |
| 2014/0360611 A1 | 12/2014 | Kiest, Jr. |
| 2014/0373631 A1 | 12/2014 | Davis et al. |
| 2015/0020908 A1 | 1/2015 | Warren |
| 2015/0045527 A1 | 2/2015 | Schleicher et al. |
| 2015/0107713 A1 | 4/2015 | Manners |
| 2015/0144480 A1 | 5/2015 | Zhao et al. |
| 2015/0151484 A1 | 6/2015 | Sanders |
| 2015/0211342 A1 | 7/2015 | Shaw et al. |
| 2015/0246501 A1 | 9/2015 | Den Besten et al. |
| 2015/0252929 A1 | 9/2015 | Jaspaert |
| 2015/0330536 A1 | 11/2015 | Jaspaert |
| 2015/0330550 A1 | 11/2015 | Hairston et al. |
| 2015/0369399 A1 | 12/2015 | Fyfe |
| 2016/0010785 A1 | 1/2016 | Arnold et al. |
| 2016/0018027 A1 | 1/2016 | Douglass, III et al. |
| 2016/0033072 A1 | 2/2016 | Mersmann et al. |
| 2016/0053922 A1 | 2/2016 | Ehsani |
| 2016/0078743 A1 | 3/2016 | Tanner |
| 2016/0091352 A1 | 3/2016 | Barto |
| 2016/0146380 A1 | 5/2016 | Anelli et al. |
| 2016/0178108 A1 | 6/2016 | Ehsani |
| 2016/0186897 A1 | 6/2016 | Stalcup, II et al. |
| 2016/0223122 A1 | 8/2016 | Kiest, Jr. |
| 2016/0245429 A1 | 8/2016 | Zhu et al. |
| 2016/0258567 A1 | 9/2016 | Hairston et al. |
| 2016/0334046 A1 | 11/2016 | Kiest |
| 2016/0348828 A1 | 12/2016 | Mathey et al. |
| 2016/0363389 A1 | 12/2016 | Hemker et al. |

(56) References Cited

U.S. PATENT DOCUMENTS

| | | |
|---|---|---|
| 2017/0043606 A1 | 2/2017 | Meltzer et al. |
| 2017/0082220 A1 | 3/2017 | Free et al. |

FOREIGN PATENT DOCUMENTS

| | | | |
|---|---|---|---|
| DE | 4326503 | A1 | 2/1995 |
| DE | 1403370 | A1 | 8/1995 |
| DE | 19941669 | A1 | 3/2001 |
| EP | 0228998 | A1 | 7/1987 |
| EP | 0510784 | A1 | 10/1992 |
| EP | 2390547 | A2 | 11/2001 |
| EP | 2273171 | A1 | 1/2011 |
| EP | 2722157 | A1 | 4/2014 |
| JP | H02219635 | | 9/1990 |
| JP | H0350280 | A | 3/1991 |
| JP | H03292127 | A | 12/1991 |
| JP | S5262379 | | 5/1997 |
| JP | 2007518608 | A | 7/2007 |
| KR | 20060012367 | | 2/2006 |
| WO | WO9114896 | A1 | 10/1991 |
| WO | WO1993015131 | A2 | 8/1993 |
| WO | WO9919659 | A1 | 4/1999 |
| WO | WO0017557 | A1 | 3/2000 |
| WO | 2002018834 | A2 | 3/2002 |
| WO | WO2005047755 | A1 | 5/2005 |
| WO | WO2005047756 | A1 | 5/2005 |
| WO | WO2005047757 | A1 | 5/2005 |
| WO | WO2006111580 | A1 | 10/2006 |
| WO | WO2012082949 | A1 | 6/2012 |
| WO | 2012145422 | A1 | 10/2012 |
| WO | 2013163736 | A1 | 5/2013 |
| WO | 2014110544 | A1 | 7/2014 |

OTHER PUBLICATIONS

Trenchless Technology, CIPP of Leaking High-Pressure Gas main, Oct. 2011, 4 pages.

Trenchless Technology, Trenchless Lateral Repair Keeps Oregon Landscape Untouched, Apr. 2012, 2 pages.

VECTORPLY(R) Performance Composite Reinforcements, product sheet E-LTM 3610, VECTORPLY(R) Corporation, Rev. May 3, 2011.

VECTORPLY(R) Performance Composite Reinforcements, product sheet E-TLX 2400, VECTORSPORTS(TM), VECTORPLY(R) Corporation, Rev. May 3, 2011.

VECTORPLY(R) Performance Composite Reinforcements, product sheet E-BX 1200, VECTORPLY(R) Corporation, Rev. May 3, 2011.

VECTORPLY(R) Performance Composite Reinforcements, product sheet E-QX 4800, LABORSAVER(TM), VECTORPLY(R) Corporation, Rev. May 3, 2011.

VECTORPLY(R) Performance Composite Reinforcements, product sheet E-LM 3610, LABORSAVER(TM), VECTORPLY(R) Corporation, Rev. May 3, 2011.

VECTORPLY(R) Performance Composite Reinforcements, product sheet E-TLX 2200, VECTORSPORTS(TM), VECTORPLY(R) Corporation, Rev. May 3, 2011.

VECTORPLY(R) Performance Composite Reinforcements, product sheet E-BXM 1708, VECTORPLY(R) Corporation, Rev. May 3, 2011.

VECTORPLY(R) Performance Composite Reinforcements, product sheet E-BX 1700, VECTORPLY(R) Corporation, Rev. May 3, 2011.

VECTORPLY(R) Performance Composite Reinforcements, product sheet E-QXCFM 3510, VECTORFUSION(TM) Infusion Specific Reinforcements, VECTORPLY(R) Corporation, Rev. May 3, 2011.

VECTORPLY(R) Performance Composite Reinforcements, product sheet E-BXCFM 1710, VECTORFUSION(TM), Infusion-Specific Reinforcements, VECTORPLY(R) Corporation, Rev. May 3, 2011.

Rongxing Zhou, An Improved MWK Structure for Composite Reinforcement, Textile Research Journal, Published by Sage, Apr. 1, 2005.

FYFE(R) an Aegion Company, Tyfo(R) Fibrwrap(R) Composite Systems, 3 pages, Copyright 2013 Fyfe Co., LLC (admitted prior art).

Oxnera, Keith B and Allsup, Todd; Advances in Cured-in-Place Pipe Rehabilitation for Pressurized Piping Systems, © 1999 Insituform Technologies, Inc., 12 pages.

BKP Berolina Polyester GmbH Co. KG Technical Data, Sep. 5, 2003, pp. 1-101.

BKP Berolina Polyester GmbH Co. KG Technical Data, Sep. 5, 2003, pp. 102-202.

* cited by examiner

PIPE LINER AND METHOD OF MAKING SAME

FIELD

The present invention generally relates to a cured-in-place pipe liner and, more specifically, to cured-in-place pipe liner comprising strengthening fibers.

BACKGROUND

Over time or because of a particular event or condition (e.g., seismic activity, exposure to excessive or uneven loads or moments, poor compaction, crown corrosion, corrosive soil, etc.), the structural integrity or capacity of force mains, other pipes, and like structures may diminish. For example, such items may crack, corrode, deteriorate, and the like. Damage to a pipe is particularly problematic when the pipe is used to carry a high pressure fluid because the pressurized fluid can impart significant forces, particularly in the hoop direction, on the pipe. Different methods of repairing or otherwise strengthening damaged pipes and other items are known. For example, reinforced fabric liners can be attached to one or more portions of a pipe interior. In cured-in-place pipe (CIPP) lining applications, liners are impregnated with a curable resin or epoxy, positioned along the interior surface of a host pipe, and allowed to cure, thereby forming a watertight barrier between the host pipe and the pipe interior. Various techniques for positioning a CIPP liner inside a host pipe (e.g., eversion, pull-in and inflate, etc.) and curing the liner (e.g., steam curing, ultraviolet light curing, etc.) are known. In addition, CIPP liners have been formed from various materials that have been constructed in many different ways. For example, it is known to form pressure-bearing liners from mats and fabrics that are laden with strengthening fibers such as glass fibers, etc.

SUMMARY

In one aspect, an eversion liner for lining a pipe comprises an outer impermeable portion having an interior. The outer impermeable portion comprises a fluid-impermeable material. The fluid impermeable material is formed into a longitudinally extending tube. The liner comprises inner and outer strength portions. The outer strength portion is located in the interior of the outer impermeable portion. Each of the inner and outer strength portions has an interior. Each of the inner and outer portions is arranged to form a respective longitudinally extending tube and comprises strengthening fibers. At least one of the inner and outer strength portions comprises a unitary sheet of strength material. The sheet of strength material has a width and opposite first and second longitudinal edge margins spaced apart along the width. The sheet of strength material comprises chopped strands of fiber oriented generally parallel to one another and distributed along the sheet of strength material. The first and second longitudinal edge margins of the sheet of strength material are positioned in overlapping engagement. The at least one of the inner and outer strength portions comprises joining structure connecting the first and second longitudinal edge margins of the sheet of strength material together in overlapped relation to form a longitudinal overlap portion extending parallel to a length of the at least one of the inner and outer strength portions. A middle portion has an interior. The middle portion comprises felt. The felt is formed into a longitudinally extending tube. The middle portion is located in the interior of the outer strength portion. The inner strength portion is located in the interior of the middle portion.

In another aspect, a method of manufacturing a liner for lining a pipe comprises forming a first strength tube comprising strengthening fibers. At least one felt tube is formed around the first strength tube. A second strength tube comprising strengthening fibers is formed around the at least one felt tube. An impermeable tube is formed around the second strength tube. At least one of the steps of forming the first strength tube and forming the second strength tube comprises: arranging a unitary sheet of strength material so that a width of the sheet extends in a hoop direction of the respective one of the first strength tube and the second strength tube. The sheet of strength material comprises chopped strands of fiber oriented generally parallel to one another and distributed along the sheet of strength material. First and second longitudinal edge margins of the sheet are joined together in overlapped relation to form a longitudinal overlap portion extending parallel to a length of the respective one of the first strength tube and the second strength tube.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
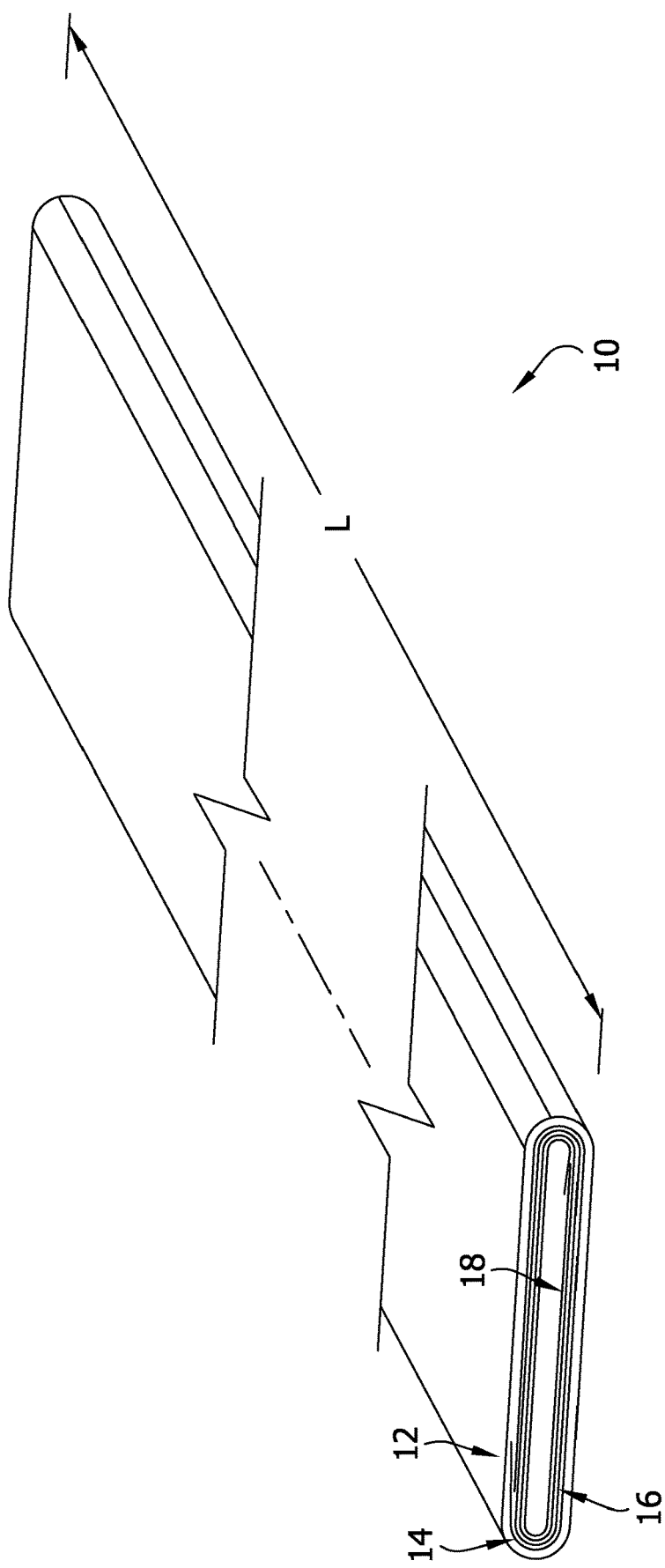
FIG. 1 is a fragmentary perspective of a liner.

Referring to FIG. 1, one embodiment of a liner for being cured in place inside a host pipe (not shown) is generally indicated at reference number 10. The illustrated liner 10 is configured to be installed by eversion. It is understood that aspects of the disclosure could be adapted for use with liners that are installed by other methods without departing from the scope of the invention. The liner 10 has a first end and a second end spaced apart along a length L of the liner. As will be explained in further detail below, the liner 10 comprises an outer portion 12, an outer strength portion 14 nested in the outer portion, a middle portion 16 nested in the outer strength portion, and an inner strength portion 18 nested in the middle portion. Each of the outer portion 12, the outer strength portion 14, the middle portion 16, and the inner strength portions 18 comprises one or more flexible tubes in the illustrated embodiment. The tubes are nested in a concentric arrangement to form the liner 10. Prior to installation, the inner strength portion 18 defines the interior of the liner 10, but after the liner is everted into a host pipe, the outer portion 12 defines the liquid flow passage of the installed liner. Throughout this disclosure the terms "inner" and "outer" (as well as other similar terminology) are used in reference to the arrangement of the liner 10 prior to eversion and as shown in the drawings. As will be described in further detail below, the illustrated liner 10 is configured so that the discrete portions 12, 14, 18, 16 are connected to one another so that liner can be reliably everted into a host pipe as a single unit. Furthermore, as discussed below, the strengthening portions 14, 18 of the liner 10 are configured to provide the installed liner with standalone pressure-bearing capacity and, moreover, do so substantially without creating wrinkles in the installed liner.

Figure 2:
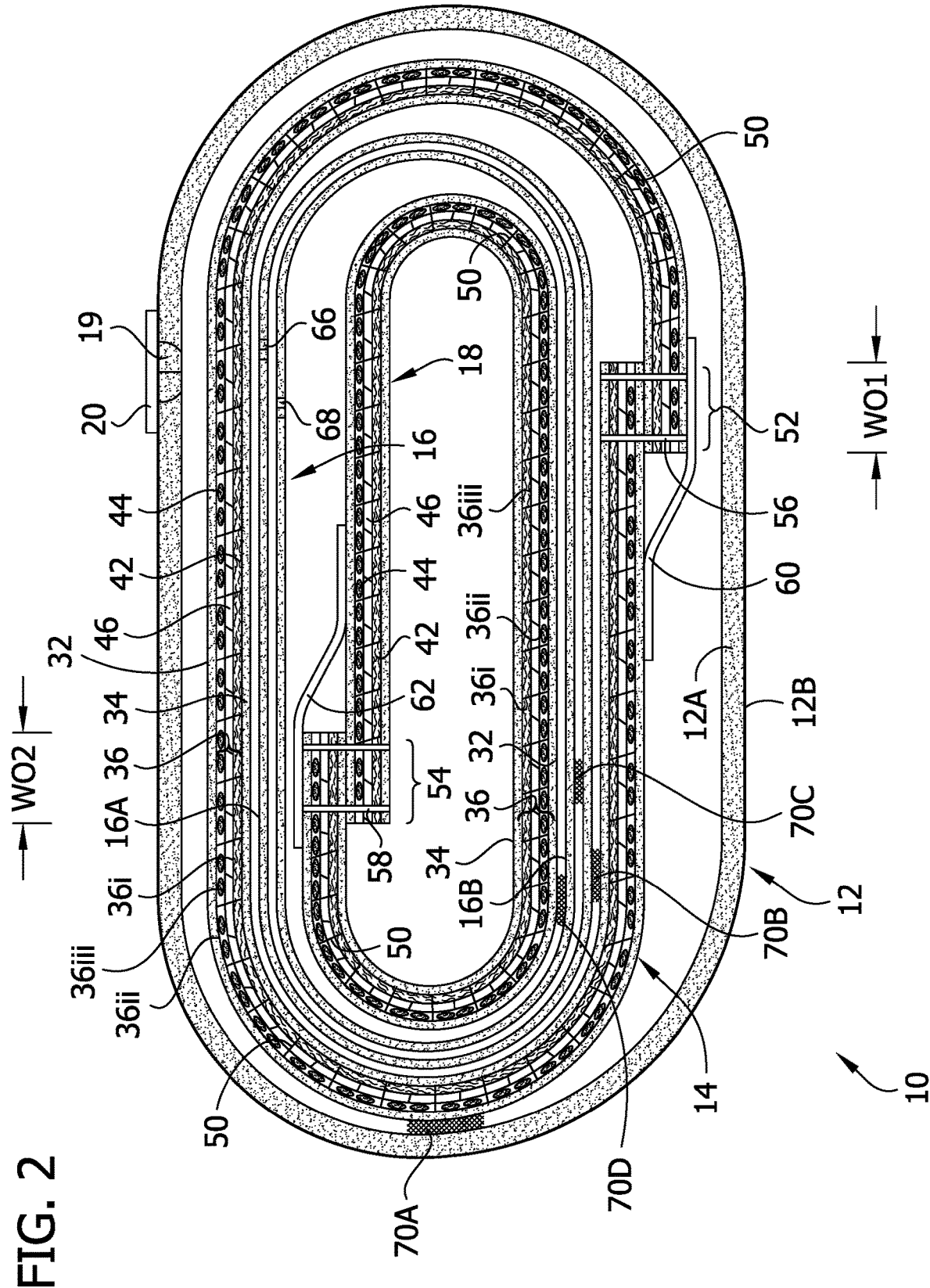
FIG. 2 is a schematic cross section of the liner.

Referring to FIG. 2, the outer portion 12 has a length that extends from the first end to the second end of the liner 10 and comprises a coated felt that is formed into a tube that extends along the length of the outer portion. The outer portion 12 comprises an inner layer of felt 12A (e.g., non-woven threads that are needle-punched, matted, condensed, or otherwise pressed together) and a fluid-impermeable coating 12B. The coating 12B can be formed by a polymer that is applied to the felt 12A in fluidic form and then cured to permanently bond to the felt. Alternatively, the coating 12B can be formed from an impermeable polymer film that is permanently bonded to the felt 12A using an adhesive, heat, etc., such that there is a bond between the coating and the felt that is substantially continuous along substantially the entire surface area of the felt. The felt 12A comprises a resin-impregnable material such as polyester felt. The impermeable coating 12B can comprise a polymer, for example a polyolefin, such as polyethylene or polypropylene; a vinyl polymer, such as polyvinylchloride; or a polyurethane. Exemplary methods of forming a coated felt outer portion 12 are described in U.S. Pat. Nos. 7,857,932, 7,261,788, and 7,238,251, each of which is hereby incorporated by reference in its entirety.

To form the outer portion 12 to a desired length, multiple sheets of coated felt are arranged end-to-end and joined together at adjoining end margins. The sheet of coated felt is folded into a tube such that side margins of the sheet engage one another, the felt layer 12A defines the interior of the tube, and the impermeable coating 12B defines the exterior of the tube. The side margins are joined together at a seam 19 (e.g., a butt seam, an overlap seam, etc.) by joining structure such as stitching, an adhesive bond, a flame bond, etc. In the illustrated embodiment, the seam 19 extends lengthwise of the outer portion 12. A fluid-impermeable tape 20 is applied to the exterior surface of the outer portion 12 along the length of the seam 19. The tape 20 can be heat-boned or chemically bonded to the exterior surface of the outer portion 12 in certain embodiments. The tape 20 seals the seam 19 so that the outer portion 12 provides a fluid-impermeable barrier.

The coating 12B on the outer portion 12 is preferably airtight and the tape 20 provides a fluid seal of the seam 19 so that the liner can be everted and expanded into contact with the pipe by fluid pressure. Suitably, the coated felt that forms the outer portion 12 is configured to stretch circumferentially when the liner 10 is expanded radially from a first diameter to a larger second diameter. When the liner 10 expands radially during installation, the coated felt stretches circumferentially while the seam 19 remains intact and sealed by the tape 20. After being everted into a host pipe, the coating 12B defines a substantially smooth, watertight surface, which extends continuously along the interior of the installed liner 10.

In the illustrated embodiment, each of the strength portions 14, 18 is formed from the same type of material and is assembled in the same general manner. It will be understood that, in other embodiments, the strength portions could have different configurations without departing from the scope of the invention. Each strength portion 14, 18 has a length extending from the first end to the second end of the liner 10 and comprises a multilayer composite material formed into a tube that extends along the length of the respective strength portion. The outer strength portion 14 extends longitudinally through the interior of the outer portion 12 and defines a longitudinal interior of its own. The middle portion 16 extends longitudinally through the interior of the outer strength portion 14, and the inner strength portion 18 extends longitudinally through the interior of the middle portion. Although the illustrated liner 10 includes an outer strength portion 14 concentrically arranged between an outer portion 12 and a middle portion 16 and an inner strength portion 18 nested inside the middle portion, other embodiments can include other numbers and arrangements of strength portions.

Figure 3:
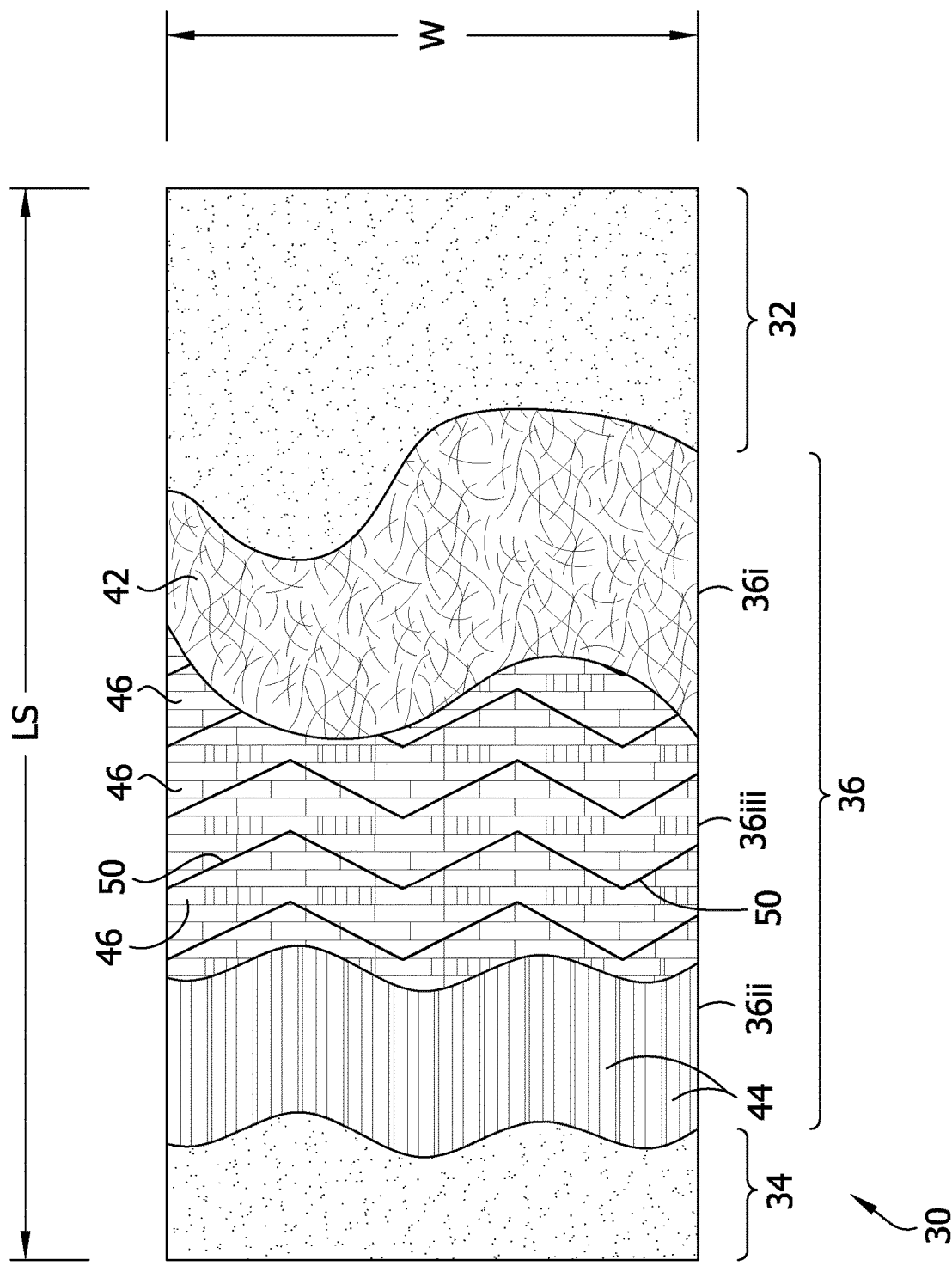
FIG. 3 is a schematic fragmentary top plan view of a sheet of material for forming a strength layer of the liner.

Referring to FIG. 3, each strength portion 14, 18 is formed from a sheet 30 of a multilayer composite fabric. FIG. 3 has been broken away to illustrate its constituent layers. It is understood that, in order to be of a desired total length, each strength portion 14, 18 could also be formed multiple sheets that are connected together in an end-to-end arrangement. Each sheet 30 has first and second end margins spaced apart along a length LS. In the assembled liner 10, the length LS of the sheet 30 extends along a length L of the liner. Each sheet 30 also has first and second side margins spaced apart along a width W. In the assembled liner 10, the width W of each sheet extends in the hoop direction (e.g., about the circumference) of the liner. To form each of the strength portions 14, 18, the respective sheet is folded into a tube such that the side margins engage one another and are joined together at a respective seam 52, 54 (FIG. 2) that is circumferentially offset from the other seam and from the seam 19 of the outer portion 12.

The multilayer sheet 30 comprises a first impregnation layer 32 formed from resin-impregnable material, a second impregnation layer 34 formed from resin-impregnable material, and a strength layer 36 that includes strengthening fibers received between the impregnation layers. In the illustrated embodiment, the strength layer 36 is also configured to be impregnated with resin or other curable polymer. Other strength portions can comprise other multilayer materials (e.g., a multilayer material comprising a single impregnation layer and one or more strength layers; two or more strength layers and impregnation layers; etc.) or a single-layer material.

In the illustrated embodiment, each of the impregnation layers 32, 34 is formed from a resin-impregnable felt, e.g., a polyester felt, which extends continuously along the length LS and width W of the sheet 30. In the illustrated embodiment, the non-woven fibers of the felt layers 32, 36 are needled to the strength layer 36 to secure the strength layer between the felt layers. Needling the felt layers 32, 34 to the strength layer 36 enables the composite fabric 30 to be handled as a unitary sheet of material when the liner 10 is assembled. The felt layers 32, 34 provide good resin-impregnation characteristics and also provide structure that is suitable for being handled by industrial sewing machines when forming the composite fabric 30 into the respective tube 14, 18. An exemplary material for the felt layers 32, 34 is polyester felt. Such felts are used by Aegion Corporation of St. Louis, Mo., in various cured-in-place pipe lining products such as, for example, InsituMain® pipe liners. Other types of felts or other resin-impregnable materials can be used to form the impregnation layer(s) of the strength portions without departing from the scope of the invention.

Suitably, the strength layer 36 comprises strengthening fibers, such as glass fibers, carbon fibers, etc. The strength layer 36 extends continuously along the length LS and width W of the fabric sheet 30. In the illustrated embodiment, the strength layer 36 is formed from first, second, and third sublayers 36i, 36ii, 36iii, and each of the sublayers extends along the length LS and width W of the fabric sheet 30. In the illustrated embodiment, the first sublayer 36i is a mat formed from randomly oriented chopped fibers 42 distributed throughout the strength layer 36. The second sublayer 36ii is formed from continuous fibers 44 oriented generally parallel to the length LS and distributed throughout the strength layer 36, and the third sublayer 36iii is formed from long oriented chop material containing long fibers 46 oriented generally parallel to one another and transverse to the continuous fibers and distributed throughout the strength layer. In the illustrated embodiment the sublayer of long oriented chopped fibers 46 is sandwiched between the sublayers of random oriented fibers 42 and continuous fibers 46; however, other arrangements of the sublayers are also possible without departing from the scope of the invention. The different types of fibers 42, 44, 46 are illustrated schematically in FIGS. 2 and 3. It will be understood that the strength layers can have other configurations in other embodiments The chopped fibers 42 are matted together in random orientations to form the sublayer 36i of the strength layer 36. The random oriented chopped fibers 42 are loosely held together in a mat such that they can shift relative to one another and allow the sublayer 36i to stretch circumferentially as the liner 10 expands radially. The random oriented fibers 42 are configured to enhance the strength of the respective strength portion 14, 18 in a non-directional manner (e.g., the random oriented fibers strengthen the liner 10 in a hoop direction and also in other directions). Moreover, as described in further detail below, the mat of random oriented fibers 42 provides a backing structure to which the bundles of fibers 44, 46 are secured to form the strength layer 36. Securing the bundles of fibers 44, 46 to the sublayer 36i of randomly oriented fibers 42 allows sheet material including the three sublayers 36i, 36ii, 36iii of strengthening fibers to be handled independently during manufacturing before it is needled or otherwise secured to one or both of the felt layers 32, 34.

In the illustrated embodiment the continuous fibers 44 are arranged in bundles that extend continuously along the length LS of each sheet 30. The bundles of continuous fibers 44 are spaced apart along the width W of the sheet 30. When the sheet is formed into the respective one of the outer and inner strength portions 14, 18, the bundles of continuous fibers 44 are spaced apart about the circumference of the respective strength portion. The bundles of continuous fibers 44 can move along the width W of the sheet 30 and about the circumference of the respective strength portion 14, 18 so that each strength portion can stretch circumferentially when the liner 10 expands radially. The illustrated continuous fibers 44 form a one-bundle-thick sublayer 36ii of fibers, but in other embodiments the bundles of continuous fibers can be stacked to form a sublayer of continuous fibers that is more than one bundle in thickness. The continuous fibers 44 provide longitudinal reinforcement of the sheet 30 and thus provide longitudinal reinforcement of the liner 10.

The long fibers 46 in the sublayer 36iii of the illustrated strength layer 36 extend generally parallel to the width W of the sheet 30. More specifically, the long fibers 46 are arranged in bundles extending generally parallel to the width of the sheet. The individual long fibers 46 thus extend generally parallel to the bundles of which they are a part. The bundles of long oriented chop fibers 46 are spaced apart from one another along the length LS of the sheet 30 to form the middle sublayer 36iii of the strength layer 36. The illustrated long fibers 46 form a one-bundle-thick sublayer 36iii of fibers, but in other embodiments the bundles of chopped fibers can be stacked to form a sublayer that is more than one bundle in thickness. The illustrated bundles of long fibers 46 are oriented generally perpendicular to the bundles of continuous fibers 44. In each of the assembled strength portions 14, 18, the bundles of long fibers 46 are spaced apart along the length of the respective strength portion and extend in the hoop direction (about the circumference of the respective strength portion) to circumferentially reinforce the liner 10. In the illustrated embodiment, each bundle of long fibers 46 extends about the entire circumference of the respective strength portion 14, 18. Each long fiber 46 has a length that is long in comparison to random oriented fibers 42, but is less than the width W of the sheet 30 and the circumference of the respective strength portion 14, 18. The fibers 46 can all have the same length or have different lengths without departing from the scope of the invention. Although the chopped fibers 46 are arranged in bundles in the illustrated embodiment, circumferentially oriented chopped fibers can also be supported in the strength layer without being arranged in bundles in other embodiments.

Referring to FIG. 2, because the bundles in each sublayer 36iii are formed from long fibers 46 instead of continuous fibers, each of the strength portions 14, 18 can stretch circumferentially when the liner 10 expands radially. In each strength layer 36, the long fibers 46 are held together loosely so that they can move relative to one another within each respective bundle in directions parallel to their lengths, along the circumference of the liner 10. Since the long fibers 46 can move relative to one another along their lengths, the middle sublayer 36iii of the strength layer 36 of each strength portion 14, 18 can be stretched circumferentially when the liner 10 expands radially. Since the felt layers 32, 34 and inner and outer sublayers 36i, 36ii of the strength layer 36 are also formed from circumferentially stretchable material as explained above, each strength portion 14, 18 is configured to stretch circumferentially as the diameter of the liner 10 increases when it is expanded during eversion.

In the illustrated embodiment stitching 50 loosely secures the bundled long fibers 46 and bundled continuous fibers 44 to the mat of random oriented fibers 42 to form the strength layer 36. But in other embodiments, other ways of loosely securing the strengthening fibers can be used without departing from the scope of the invention. The stitching 50 is sufficiently loose to permit the long fibers 46 within each circumferential bundle to move relative to one another along the circumference of the strength layer 36 but is sufficiently strong to hold the fibers 42, 44, 46 of the strength layer together during manufacturing. The stitching 50 is also configured to allow the random oriented fibers 42 to shift and the bundles of continuous fibers 44 to move circumferentially of the liner 10 during installation. Thus, the stitching 50 is configured to maintain the general arrangement of the strengthening fibers 42, 44, 46 during installation while permitting the strengthening fibers to move as required to facilitate circumferential stretching of the strength layer 36 when the liner 10 is radially expanded.

In each strength portion 14, 18, the composite fabric sheet 30 is folded so that the side margins of the fabric sheet overlap one another at a respective seam 52, 54. Each seam thus comprises an overlap portion that extends generally along the length L of the liner 10. In the illustrated embodiment, overlap stitching 56, 58 secures the overlapping side margins of the respective sheet 30 together in each strength portion 14, 18. In other embodiments, the overlapped side margins could be secured together by other types of joining structure, e.g., a heat bond, an adhesive bond, etc.

Each overlap portion 52, 54 has a width WO1, WO2. In certain embodiments each width WO1, WO2 is in an inclusive range of from about 1.5 inches (3.8 cm) to about 2.5 inches (6.46 cm). Widths in this range can be suitable for using an industrial sewing machine to stitch the overlap portion 52, 54. However, it will be understood that overlap portions of other widths can be used in other embodiments. The stitching 56, 58 allows the tube to expand circumferentially without breaking the respective seam 52, 54. Because the impregnation layers 32, 34 and strength layer 36 are configured to stretch circumferentially, when each strength layer 14, 18 expands from a first diameter to a larger second diameter during installation, the width WO1, WO2 of the respective longitudinal overlap portion 52, 54 does not decrease. Instead the width WO1, WO2 of the respective longitudinal overlap portion 52, 54 either stays the same or increases, increasing proportionally with the increase in circumference of the respective strength portion 14, 18. The stitching 56, 58 holds the longitudinal side margins of the sheet 30 together at each seam 52, 54 even after the diameter of the respective strength portion 14, 18 increases.

In one or more embodiments, each overlap portion 52, 54 is reinforced with a reinforcing strip 60, 62. The reinforcing strips 60, 62 can comprise any suitable reinforcing material. In certain embodiments, each reinforcing strip 60, 62 comprises a two-layer material comprising a felt layer and a fibrous layer that is needle punched or otherwise secured to the felt layer. In one embodiment, the reinforcing strip 60, 62 is attached to the outer felt layer 34 of the respective strength portion 14, 18 at locations on opposite sides of the overlap seam 52, 54, e.g., by flame bonds, adhesive bonds, stitching, etc. In certain embodiments, each reinforcing strip 60, 62 extends continuously along the length of the respective strength portion 14, 18. Each reinforcing strip 60, 62 can be bonded to the outer felt layer 34 of the respective strength portion 14, 18 on opposite sides of the seam 52, 54 continuously along, or at spaced apart locations along, the length of the respective strength portion.

The middle portion 16 has a length extending from the first end to the second end of the liner 10 and comprises felt formed into a tube having an interior. As explained above, the middle portion 16 extends longitudinally through the interior of the outer strength layer 14, and the inner strength layer 18 extends longitudinally through the interior of the middle portion. The middle portion 16 comprises one or more discrete felt layers 16A, 16B, each formed into a discrete felt tube. The felt tubes 16A, 16B are each configured to be impregnated with a curable polymer such as resin. In the illustrated embodiment, the middle portion 16 comprises two discrete felt tubes 16A, 16B that are arranged concentrically. It will be understood that the middle portion of other liners can have other numbers of felt tubes (for example zero or more felt tubes, e.g., a number of felt tubes in an inclusive range of from 1 to 5, etc.)

Each discrete felt layer 16A, 16B comprises a sheet of felt (or a plurality of sheets of felt arranged end-to-end) having first and second end margins spaced apart along a length that extends along the length of the middle portion 16 and first and second side margins spaced apart along a width that extends about a circumference of the middle portion. Each felt sheet 16A, 16B is folded into a tube such that the side margins of the sheet engage one another and are joined together at a respective seam 66, 68. In the illustrated embodiment, the side margins are joined together at a stitched butt seam, but the side margins can be joined together in other ways without departing from the scope of the invention. Suitably, each seam 66, 68 is configured to withstand circumferential stretching of the middle portion 16 as the liner 10 expands radially during installation. In one or more embodiments, all of the seams 19, 52, 54, 66, 68 in the liner 10 are offset circumferentially from one another.

In the illustrated embodiment, the outer portion 12, the outer strength portion 14, each of the middle felt tubes 16A, 16B, and the inner strength portion 18 each comprises a respective tube of the liner 10. The individual tubes 12, 14, 16A, 16B, 18 included in the liner 10 are bonded together at bonds 70A-70D. In one or more embodiments, each of the bonds 70A-70D extends continuously or intermittently along the length L of the liner 10. The outer portion 12 of the liner is bonded to the outer felt layer 32 of the outer strength portion 14 at a bond 70A; the inner felt layer 34 of the outer strength portion is bonded to the outer felt tube 16A at a bond 70B, the outer felt tube is bonded to the inner felt tube 16B at a bond 70C; and the inner felt tube is bonded to the outer felt layer 32 of the inner strength layer 18 at a bond 70D. Because the opposing surfaces the tubes 12, 14, 16A, 16B, 18 are all formed of felt material, the bonds 70A-70D can comprise flame bonds. In other words, in the illustrated embodiment, each discrete tube 12, 14, 16A, 16B, 18 is flame bonded to an adjacent tube to form a unitary liner 10. It will be understood that other types of bonds (e.g., adhesive bonds, a mix of flame bonds and adhesive bonds, etc.) can also be used to secure together two or more tubes of a liner in other embodiments.

In an exemplary method of manufacturing the liner 10, the manufacturer folds a composite fabric sheet 30 into an inner strength tube 18 so that the longitudinal side margins overlap one another at an overlap seam 54. The manufacturer guides the inner strength tube 18 through a stitching machine to stitch the side margins together along the overlap seam 54. The manufacturer then bonds the reinforcing strip 62 to the overlap portion 54 using an adhesive bond, a flame bond, etc.

After forming the inner strength tube 18, the manufacturer wraps one or more sheets of felt 16A, 16B around it to form the middle portion 16. In one embodiment, the manufacturer guides each sheet of felt through a stitching machine to stitch together the longitudinal side margins at the seams 66, 68. Suitably, the manufacturer wraps each felt sheet so that the seams 66, 68 are circumferentially spaced from the seam 54 of the inner strength tube 18. Each felt tube 16A, 16B is also flame bonded to the tube that is received in its interior. For example, in the illustrated embodiment, the manufacturer flame bonds the felt tube 16B to the inner strength portion 18 at flame bond 70D and flame bonds the felt tube 16A to the other felt tube at flame bond 70C.

After the desired number of felt tubes is/are formed and flame bonded to the inner strength portion 18, the manufacturer wraps another composite fabric sheet 30 around the middle portion 16 to form the outer strength tube 14. The manufacturer folds the sheet 30 around the middle portion 16 so that the longitudinal side margins of the sheet overlap one another at an overlap seam 52. Suitably, the manufacturer wraps the composite fabric sheet 30 so that the overlap seam 52 is circumferentially spaced from the overlap seam 54 and each of the seams 66, 68. The manufacturer guides the outer strength tube 14 through a stitching machine to stitch together the longitudinal side margins of the composite fabric sheet 30 along the overlap seam 52. The manufacturer then bonds the reinforcing strip 60 to the overlap seam 52 using an adhesive bond, a flame bond, etc. The outer strength tube 14 is also flame bonded to the outer felt tube 16A at a flame bond 70B.

The manufacturer then wraps a sheet of coated felt around the outer strength tube 14 to form the outer tube 12. Specifically, the manufacturer folds the coated felt around the outer strength tube 14 so that the longitudinal side margins engage one another and the coating 12B defines the exterior of the tube. The manufacturer guides the coated felt tube 12 through a stitching machine to stitch together the side margins of the material at the seam 19. The manufacturer then applies impermeable tape 20 along the seam 19 to seal the seam.

To install the liner 10 in a host pipe (not shown), the liner is initially impregnated with curable polymer such as resin. Various techniques for impregnating a liner with curable polymer are known or may become known, and any suitable technique can be used without departing from the scope of the invention. For example, a resin impregnation system is disclosed in U.S. Pat. No. 7,238,251, which is hereby incorporated by reference in its entirety. In one embodiment, the step of impregnating the liner 10 with resin is performed at a factory remote from the host pipe and the impregnated liner is transported to the site of the host pipe in a suitably climate controlled truck. In other embodiments, the crew could impregnate the liner 10 at the site of the host pipe without departing from the scope of the invention. Suitably, the step or impregnating the liner 10 with resin distributes resin throughout the felt layer 12A of the outer tube 12, each of the layers 32, 34, 36 of the outer strength tube 14, each of the felt tubes 16A, 16B, and each of the layers 32, 34, 36 of the inner strength tube 18, as well as through each of the reinforcing strips 60, 62.

After the liner 10 is impregnated with resin, the crew installs the liner inside the host pipe by everting the liner. In the eversion process, the liner 10 is turned inside out, advancing down the host pipe as more of the liner is everted. The eversion process presses the inner strength portion 18 against the interior surface of the host pipe and causes the coating 12B of the outer portion 12 to become the interior surface of the lined pipe. Thus, after eversion is complete, the impermeable coating 12B provides a resin barrier that prevents the resin in the liner 10 from escaping into the interior of the pipe. During the eversion process, the flame bonds 70A-70D maintain secure connections among the discrete tubes 12, 14, 16A, 16B, 18 such that liner retains its structure and can be everted as a single unit. Various techniques for everting the liner 10 are known or may become known, and any suitable technique can be used without departing from the scope of the invention. For example, systems for everting a liner are disclosed in U.S. Pat. Nos. 9,453,597, 8,066,499, 7,866,968, and 7,766,048, each of which is hereby incorporated by reference in its entirety.

Prior to eversion, the liner 10 and each of the tubes 12, 14, 16A, 16B, 18 has a respective initial diameter. The eversion process stretches the liner 10 and each tube 12, 14, 16A, 16B, 18 from its initial diameter to a larger second diameter. As explained above, the arrangement of strengthening fibers 42, 44, 46 within each of the strength portions 14, 18 allows the strength portion to stretch circumferentially without reducing the width WO1, WO2 of the respective overlap portion 52, 54. The stretching of the liner 10 helps prevent wrinkles from forming as the liner is positioned in contact with the interior surface of the host pipe 10. Thus, after eversion is complete, the impermeable coating 12B forms a smooth surface along which liquid may flow with minimal drag. The continuous fibers 44 resist elongation of the liner 10.

Once the liner 10 is positioned in continuous contact with the interior surface of the host pipe, the resin in the liner cures to form a cured-in-place liner along the interior surface of the host pipe. In certain embodiments, the resin cures in ambient conditions. In other embodiments, the crew cures the resin by directing a suitable form of curing energy, such as heat, ultraviolet radiation, etc., toward the resin impregnated liner 10. Various techniques for curing a resin-impregnated liner are known or may become known, and any suitable technique can be used without departing from the scope of the invention. For example, curing systems are disclosed in several of the U.S. Patents incorporated by reference above, as well as in U.S. Pat. No. 7,360,559, each of which is hereby incorporated by reference in its entirety.

The cured resin strongly binds each of the tubes 12, 14, 16A, 16B, 18 together after the installed liner 10 is put into service. Furthermore, the strength layers 36 (in particular, the circumferentially oriented fibers 46) of the inner and outer strength tubes 14, 18 circumferentially reinforce the host pipe to withstand internal loads (e.g., internal fluid pressures, etc.) and/or external loads (e.g., seismic loads, etc.). As can be seen therefore, the liner 10 can be installed by eversion and provide a new, high strength pipe inside a host pipe that defines a substantially smooth, watertight flow passage.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An eversion liner for lining a pipe, the liner comprising:
an outer impermeable portion having an interior, the outer impermeable portion comprising a fluid-impermeable material, the fluid impermeable material being formed into a longitudinally extending tube;
inner and outer strength portions, the outer strength portion being located in the interior of the outer impermeable portion, each of the inner and outer strength portions having an interior, each of the inner and outer portions being arranged to form a respective longitudinally extending tube and comprising strengthening fibers, at least one of the inner and outer strength portions comprising a unitary sheet of strength material, the sheet of strength material having a width and opposite first and second longitudinal edge margins spaced apart along the width, the sheet of strength material comprising chopped strands of fiber gathered into bundles, the bundles being oriented generally parallel to one another and distributed along the sheet of strength material, each of the bundles extending in a direction from the first longitudinal edge margin to the second longitudinal edge margin of the sheet of strength material, the first and second longitudinal edge margins of the sheet of strength material being positioned adjacent one another and being attached to one another at a seam, the sheet of strength material being configured for being stretched radially from a first external diameter to a second external diameter larger than the first external diameter, the seam being constructed to hold the first longitudinal edge margin from moving in a circumferential direction relative to the second longitudinal edge margin as the liner tube is stretched radially from the first external diameter to the second external diameter; and
a middle portion having an interior, the middle portion comprising felt, the felt being formed into a longitudinally extending tube, the middle portion being located in the interior of the outer strength portion, the inner strength portion being located in the interior of the middle portion.

2. An eversion liner as set forth in claim 1, wherein the chopped strands of fiber are arranged to strengthen the liner in a hoop direction of the liner.

3. An eversion liner as set forth in claim 1, wherein the chopped strands of fiber extend generally parallel to the width of the sheet of strength material.

4. An eversion liner as set forth in claim 1, wherein the sheet of strength material further comprises an inner felt layer and an outer felt layer, the chopped strands of fiber being sandwiched between the inner and outer felt layers.

5. An eversion liner as set forth in claim 4, wherein the inner and outer felt layers are needle punched to the chopped strands of fiber.

6. An eversion liner as set forth in claim 4, wherein one of the inner and outer felt layers is flame bonded to the middle portion.

7. An eversion liner as set forth in claim 1, wherein the sheet of strength material further comprises continuous strands of fiber distributed along the sheet of strength material, the continuous strands of fiber being oriented parallel to one another and transverse to the chopped strands of fiber.

8. An eversion liner as set forth in claim 1, wherein the sheet of strength material further comprises a mat of random oriented chopped fibers.

9. An eversion liner as set forth in claim 1, wherein longitudinal edge margins of the sheet of strength material are positioned in overlapping engagement the longitudinal to form an overlap portion having a width, the eversion liner being configured to be everted into a host pipe such that the at least one of the inner and outer strength portions expands from a first diameter to a larger second diameter without decreasing the width of the longitudinal overlap portion.

10. An eversion liner as set forth in claim 9, wherein the longitudinal overlap portion of has a width of at least about 3.8 cm.

11. An eversion liner as set forth in claim 1, wherein the seam comprises stitching.

12. An eversion liner as set forth in claim 1, wherein the at least one of the inner and outer strength portions further comprises a reinforcing strip, the reinforcing strip extending along the longitudinal overlap portion and being attached to the sheet of strength material at locations adjacent each of the first and second longitudinal edge margins.

13. An eversion liner as set forth in claim 1, wherein the middle portion comprises a plurality of discrete felt layers.

14. An eversion liner as set forth in claim 1, wherein each of the discrete felt layers is flame bonded to an adjacent one of the other discrete felt layers.

15. An eversion liner as set forth in claim 1, wherein the middle portion comprises a number of discrete felt layers in an inclusive range of from 1 to 5 discrete felt layers.

16. An eversion liner as set forth in claim 1, wherein the fluid-impermeable material comprises coated felt.

17. An eversion liner as set forth in claim 1, wherein the at least one of the inner and outer strength portions includes each of the inner and outer strength portions.

18. A. method of manufacturing a liner for lining a pipe, the method comprising:

forming a first strength tube comprising strengthening fibers;

forming at least one felt tube around the first strength tube;

forming a second strength tube comprising strengthening fibers around the at least one felt tube; and forming an impermeable tube around the second strength tube;

wherein at least one of the steps of forming the first strength tube and forming the second strength tube comprises:

arranging a unitary sheet of strength material so that a width of the sheet extends in a hoop direction of the respective one of the first strength tube and the second strength tube, the sheet of strength material comprising chopped strands of fiber gathered into bundles, the bundles being oriented generally parallel to one another and distributed along the sheet of strength material, each of the bundles extending in a direction from the first longitudinal edge margin to the second longitudinal edge margin of the sheet of strength material; and joining first and second longitudinal edge margins of the sheet together in overlapped relation to form a longitudinal overlap portion extending parallel to a length of the respective one of the first strength tube and the second strength tube at a seam, the seam being constructed to hold the first longitudinal edge margin from moving in a circumferential direction relative to the second longitudinal edge margin as the liner is stretched radially from the first external diameter to the second external diameter.

19. A method as set forth in claim 18, wherein the at least one of the steps of forming the first strength tube and forming the second strength tube further comprises needle punching the chopped strands of fiber between two layers of felt.

20. A method as set forth in claim 18, further comprising flame bonding the at least one felt tube to each of the first strength tube and the second strength tube.

* * * * *